No. 609,740. Patented Aug. 23, 1898.
L. C. GILLETT.
STEAM HEATER AND COOKER.
(Application filed Jan. 17, 1898.)
(No Model.)
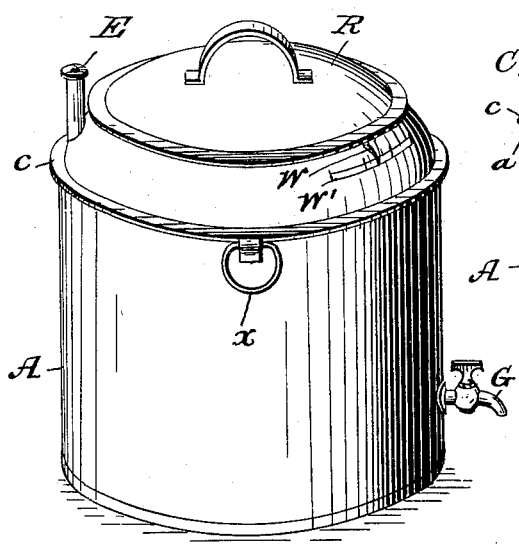
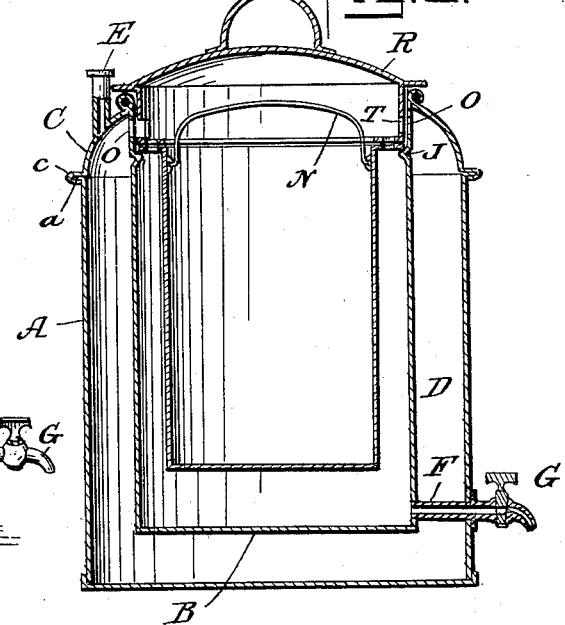
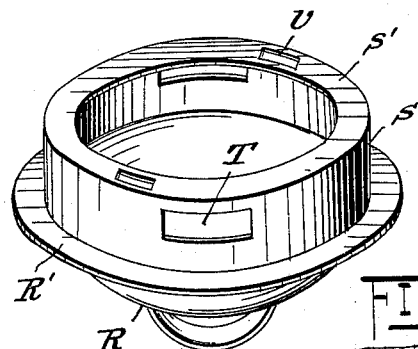
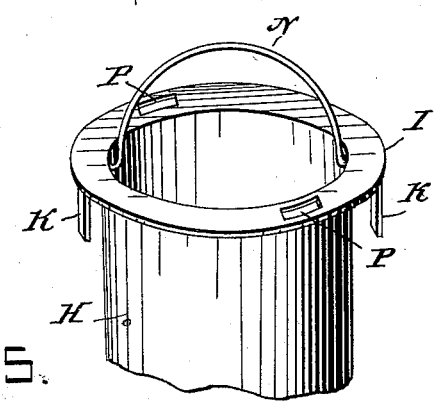
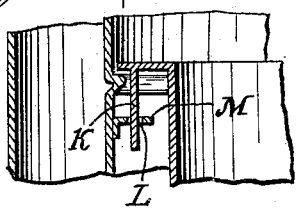
Witnesses:
Inventor
Leonard C. Gillett.

UNITED STATES PATENT OFFICE.

LEONARD C. GILLETT, OF BROWNSDALE, MINNESOTA.

STEAM HEATER AND COOKER.

SPECIFICATION forming part of Letters Patent No. 609,740, dated August 23, 1898.

Application filed January 17, 1898. Serial No. 666,959. (No model.)

*To all whom it may concern:*

Be it known that I, LEONARD C. GILLETT, a citizen of the United States, residing at Brownsdale, in the county of Mower and State of Minnesota, have invented certain new and useful Improvements in Steam Heaters and Cookers; and I do hereby declare the following to be a full, clear, and exact description of the invention, such as will enable others skilled in the art to which it appertains to make and use the same.

This invention relates to improvements in steam cooking utensils; and the object thereof is to provide a utensil having a steam-chamber, a plurality of receptacles in which the articles to be heated or cooked are placed, and means for controlling the passage of steam from the steam-chamber to the respective receptacles, the utensil being simple in construction and effective in operation.

With the above object in view the invention consists in the novel details of construction hereinafter fully described in the specification, particularly referred to in the claims, and illustrated by the accompanying drawings, in which—

Figure 1 is a perspective view of a steam cooking utensil embodying my invention. Fig. 2 is a vertical sectional view of the same. Fig. 3 is a perspective view of the cover or lid, shown in an inverted position. Fig. 4 is a detail perspective view of the upper end of the removable receptacle. Fig. 5 is a sectional detail view showing the construction for holding the removable receptacle in proper position within the inner receptacle.

Referring to the accompanying drawings, A indicates the outer receptacle or casing, and B a receptacle positioned therein, said receptacle having the downwardly and outwardly flaring flange C formed integral with the upper edge thereof and united to the upper edge of the outer receptacle by bending its edge c around a flange a, formed upon said upper edge of the outer receptacle. Thus the receptacle B is secured within the casing A, and it is of such size as to leave a space between its side and bottom walls and the side and bottom walls of said outer casing, said space constituting a chamber D to contain the steam and water from which it is generated.

For the purpose of filling the receptacle B with water a spout or filling-tube E is provided in the flange C, and said tube may contain a pressure-valve to be operated when the pressure of steam reaches a certain point to permit the surplus steam to escape.

Receptacle B is provided with an outlet adjacent its lower end, and extending therefrom to the exterior of casing A is the outlet-tube F, by means of which the contents of receptacle B may be drawn therefrom, said tube being provided with a stop-cock G, controlling the same.

A removable receptacle H is positioned within receptacle B with the circumferential flange I, formed about its upper edge, resting upon the bead J, formed upon the inner surface of said receptacle B at a point below the upper edge thereof. Lugs K, depending from the under side of flange I, engage the slots L of ears or brackets M, secured to the inner walls of receptacle B, and thus lock the removable receptacle from rotary movement within said inner receptacle B.

Removable receptacle H is provided with a bail N, which is pivoted upon the interior of said receptacle and by means of which the latter may be withdrawn from or positioned within said receptacle B.

Receptacle B is formed with the slots O in its walls at a point above the bead J and on opposite sides of its center, while flange I of receptacle H is formed with slots P, also on opposite sides of its center, said slots constituting steam-ports, whereby the steam may pass from chamber D into receptacles B and H.

For controlling the passage of steam into the respective receptacles I provide the lid or cover R, having the flange R', which rests upon the upper edge of receptacle B, and with the vertical annular wall S, which depends within said receptacle. Upon the lower edge of this vertical wall is an inwardly-extending annular flange S', which is adapted to rest upon flange I of receptacle H when the cover is in position, as illustrated in Fig. 2.

Elongated slots T are formed in the vertical wall of the cover and are adapted to register with the ports in receptacle B, so that the steam may pass therethrough.

The cover may be rotated by means of the handle U to vary the amount of steam admitted to receptacles B and H or to entirely close the steam-ports and shut off the passage of steam therethrough.

Flange S' of the cover is provided with slots V, which are adapted to register with ports P in flange I of receptacle H, so that the passage of steam to receptacle B may be regulated or entirely shut off, as desired.

The ports in the receptacle B, in flange I of receptacle H, and in the vertical wall and flange of the cover are so arranged that said cover may be rotated to permit steam to pass into receptacle H only and to vary or entirely shut off the passage of steam thereto and in the meantime prevent any steam from entering receptacle B, or said cover may be moved to admit steam to both receptacles at the same time or vary or entirely close the passage of steam thereto.

The cover carries a pointer W, which coacts with a scale W' upon flange C, so that it may be accurately rotated to admit the steam to the receptacles, as desired.

Casing A is provided with the rings X, by means of which it may be carried from place to place.

In operation water is placed in chamber D and steam generated therefrom. The articles to be heated or cooked are placed in the receptacles B and H and the cover operated to control the passage of steam thereto, as may be required.

From the above description it will be seen that I have produced a steam cooking utensil which is simple in construction and effective in operation and have provided an improved construction whereby the passage of steam into the several receptacles is readily and conveniently controlled.

Having thus fully described my invention, what I claim as new and useful, and desire to secure by Letters Patent, is—

1. In a steam cooking utensil, the combination with a steam-chamber of a receptacle provided with a steam-inlet port, and a cover for said receptacle having an inlet-port which is adapted to register with the inlet-port of the receptacle when the cover is rotated, substantially as described.

2. In a steam cooking utensil, the combination with a receptacle having a steam-chamber and a steam-inlet port communicating therewith, of a receptacle removably positioned within said receptacle and of such size as to form a chamber between its walls and the walls of the latter, and having a flange closing said chamber and provided with a port, and a cover for the outer receptacle having a flange which rests upon the flange of the inner receptacle and provided with a port adapted to register with the port thereof when the cover is rotated, said cover also provided with a port adapted to register with the inlet-port of the outer receptacle, substantially as described.

3. In a steam cooking utensil, the combination with a receptacle having a steam-chamber, and an inlet-port communicating therewith, said receptacle also provided with slotted ears, of a receptacle adapted to be positioned within said outer receptacle and carrying lugs adapted to engage said slotted ears, and a cover adapted to control the passage of steam into said receptacles, substantially as described.

In testimony whereof I affix my signature in presence of two witnesses.

LEONARD C. GILLETT.

Witnesses:
　ALEX. KERR,
　IDA KERR.